US012650109B2

(12) United States Patent
Pratt

(10) Patent No.: US 12,650,109 B2
(45) Date of Patent: Jun. 9, 2026

(54) WIND-BASED POWER GENERATION SYSTEM

(71) Applicant: Terry Wayne Pratt, Cedar Point, NC (US)

(72) Inventor: Terry Wayne Pratt, Cedar Point, NC (US)

( * ) Notice: Subject to any disclaimer, the term of this patent is extended or adjusted under 35 U.S.C. 154(b) by 23 days.

(21) Appl. No.: 18/598,343

(22) Filed: Mar. 7, 2024

(65) Prior Publication Data

US 2024/0301868 A1     Sep. 12, 2024

Related U.S. Application Data

(60) Provisional application No. 63/488,845, filed on Mar. 7, 2023.

(51) Int. Cl.
| | |
|---|---|
| *F03D 3/02* | (2006.01) |
| *F03D 9/28* | (2016.01) |
| *F03D 13/20* | (2016.01) |
| *F15B 15/18* | (2006.01) |

(52) U.S. Cl.
CPC ................ *F03D 3/02* (2013.01); *F03D 9/28* (2016.05); *F03D 13/201* (2023.08); *F15B 15/18* (2013.01); *F03D 13/20* (2016.05); *F05B 2240/912* (2013.01); *Y02E 10/72* (2013.01)

(58) Field of Classification Search
CPC ... F03D 3/005; F03D 3/02; F03D 9/17; F03D 9/25; F03D 9/34; F03D 13/20; F03D 13/2005; F03D 13/201; F03D 15/205; F03D 15/207
See application file for complete search history.

(56) References Cited

U.S. PATENT DOCUMENTS

| | | | | |
|---|---|---|---|---|
| 4,057,270 | A * | 11/1977 | Lebost | F03D 3/0472 |
| | | | | 415/4.4 |
| 6,955,521 | B2 * | 10/2005 | Yang | F03D 3/0481 |
| | | | | 415/121.2 |
| 7,453,168 | B2 * | 11/2008 | Lanie | F03D 80/00 |
| | | | | 290/55 |
| 7,880,323 | B2 * | 2/2011 | Menges | F03D 15/20 |
| | | | | 290/55 |
| 8,232,664 | B2 * | 7/2012 | Stroup | F03D 15/10 |
| | | | | 290/55 |
| 8,754,541 | B2 * | 6/2014 | Van Den Bulcke | F03D 9/35 |
| | | | | 290/55 |
| 9,970,416 | B2 * | 5/2018 | Pekelis | F03D 3/04 |
| 10,253,754 | B2 * | 4/2019 | Aga | F03D 3/005 |
| 10,495,065 | B2 * | 12/2019 | Fortner | E04H 12/00 |
| 11,125,208 | B2 * | 9/2021 | Williams | F03D 3/068 |
| 11,486,358 | B2 * | 11/2022 | Williams | F03D 3/067 |
| 11,644,010 | B1 * | 5/2023 | Menges | H02K 7/183 |
| | | | | 290/55 |
| 2022/0106936 | A1 * | 4/2022 | Luo | F03D 3/04 |

FOREIGN PATENT DOCUMENTS

JP          2011094583 A  *  5/2011

* cited by examiner

*Primary Examiner* — Michael Leslie
(74) *Attorney, Agent, or Firm* — NK Patent Law

(57) ABSTRACT

A wind-based power generation system including a base, a plurality of towers including a plurality of turbines, at least one pneumatic pump, at least one pneumatic motor, at least one pneumatic generator, an air storage chamber, and a tail component. The wind-based power generation system receives wind via the plurality of turbines and transmit the airflow to pneumatic pumps and motors to power a generator.

19 Claims, 16 Drawing Sheets

200

300

400

500

600

700

900

1300

1500

1600

1602

WIND-BASED POWER GENERATION SYSTEM

CROSS-REFERENCE TO RELATED APPLICATIONS

This application claims the benefit of U.S. Provisional Patent Application No. 63/488,845, filed on Mar. 7, 2023, the entire contents of which are incorporated by reference herein.

BACKGROUND

Wind power is a competitive alternative to fossil fuels and other energy sources. However, wind power is limited by installation challenges, the variability of wind, and the environmental impact of current wind-based power generation devices (e.g., windmills). Generally, wind-based power generation devices are limited to locations with high amounts of wind, which results in many wind farms being located in remote areas. Additionally, wind farms create noise pollution as a result of wind turbines and visually impair a landscape due to the immense size of wind turbines. Furthermore, wind turbines can negatively impact wildlife interactions (e.g., bird migration). Therefore, there is a need for a wind-based power generation system that addresses the installation challenges and minimizes the environmental impact of wind-based power generation systems.

FIELD OF THE INVENTION

The present invention is generally directed to wind-based power generation systems and apparatuses, more specifically to wind-based power generation systems and apparatuses using pneumatic motors.

DESCRIPTION OF RELATED ART

Wind turbines are designed to rotate in response to wind. The wind turbine transfers the kinetic energy of the wind into rotational energy. The rotational energy is used to power a generator to create electricity. Generally, the size and orientation of the blade rotors, the aerodynamic design of the blades, and the amount of wind affect the power-generating ability of a wind turbine.

Blade rotors are typically positioned in either a vertical or horizontal manner. Vertical rotors increase the number of directions that the turbine can receive wind, however, generally, these are less efficient than horizontal rotors. Horizontal rotors capture the full force of the wind by tracking the direction of the wind and facing it (e.g., yawing). Additionally, wind turbines are further complicated by the use of controllable electronics and sensors designed for blade pitching, blade dynamics, bearings, gearbox monitoring, tower sway, and tower leveling. These controllable electronics and sensors are extremely sensitive and only increase the expensive cost of building and maintaining wind turbines.

Wind travels faster over the curved surfaces and creates lift, therefore, many wind turbines blades are shaped like airplane wings. Additionally, twist is added to the wind turbine blades to optimize how much of the turbine cuts the wind. However, there is a mathematical limit to the conversion of the wind kinetic energy to rotational energy. Wind turbines can only capture 59.3% of the wind kinetic energy. Therefore, since the efficiency of wind-based power generation devices is limited, currently, a wind turbine is only useful in a windy environment and must be a massive size to increase the amount of wind captured. This results in turbines averaging over 100 feet in height. Unfortunately, the height of wind turbines increases the impact on environmental scenery and increases the chances that birds and other animals will fly into the blades.

Lastly, wind power is highly intermittent and can affect power grid stability. Current wind-based power generation systems are limited and not cost-effective due to the expensive and cumbersome characteristics of wind turbine design. Therefore, there is a need for wind-based power generation devices and systems that minimize the environmental impact while maintaining power production and efficiency.

BRIEF SUMMARY

The present invention is generally directed to wind-based power generation systems and devices. More specifically, the present invention includes a wind-based power generation system including a plurality of pneumatic motors designed to receive air pressure from the wind to create electricity. Advantageously, the wind-based power generation system can be positioned on the tops of buildings and other similar structures but does not need to be a standalone structure to generate electricity.

In some embodiments, a wind-based power generation system is disclosed. The wind-based power generation system includes a base, a plurality of towers including a plurality of turbines, a tail component, and a support structure. The plurality of towers is connected to the base. The tail component is positioned on top of the base. The plurality of turbines rotate in response to airflow. The base is rotatably attached to the support structure.

In some embodiments, the wind-based power generation system further includes a base including at least one pneumatic pump. The at least one pneumatic pump is in fluid communication with the plurality of turbines. In some embodiments, the base further includes a storage component in fluid communication with the at least one pneumatic pump. In some embodiments, the base further includes a pneumatic motor in fluid communication with the storage component. In some embodiments, the base further includes a power generator connected to the pneumatic motor and the power generator is driven by the pneumatic motor. In some embodiments, the tail component changes a direction and position of the base and the plurality of towers in response to a change of airflow (e.g., wind) direction. In some embodiments, the base includes concrete. In some embodiments, the plurality of towers includes a triangular shape, a rectangular shape, or a hexagonal shape. In some embodiments, the base further includes a leading edge designed to push airflow underneath the base to the plurality of towers. In some embodiments, each tower of the plurality of towers is independently controllable. In some embodiments, each tower of the plurality of towers includes carbon fiber and a honeycomb shape. In some embodiments, each tower of the plurality of towers is magnetically attached to the base.

In some embodiments, a wind-based power generation system is closed. The wind-based power generation system includes a base including a pneumatic pump, a storage chamber, and a pneumatic motor, a plurality of towers including a plurality of turbines, a tail component, and a support structure. The plurality of towers is connected to the base. The plurality of turbines rotate in response to airflow. The plurality of turbines is in fluid communication with the pneumatic pump. The pneumatic pump is in fluid communication with the storage chamber. The storage chamber is in fluid communication with the pneumatic motor. The base is rotatably attached to the support structure.

In some embodiments, the wind-based power generation system further includes a power generator driven by the pneumatic motor. In some embodiments, the tail component is designed to change a direction and/or position of the base and the plurality of towers in response to a change of airflow (e.g., wind) direction. In some embodiments, the wind-based power generation system includes a plurality of towers including a triangular shape, a rectangular shape, or a hexagonal shape. In some embodiments, the base further includes a leading edge designed to push airflow underneath the base to the plurality of towers.

In some embodiments, a wind-based power generation system is disclosed. The wind-based power generation system includes a base including a pneumatic pump, a storage chamber, a pneumatic motor, and a power generating component. The wind-based power generation system further includes a plurality of towers including a plurality of turbines, a tail component, and a support structure. The plurality of towers is connected to the base. The plurality of turbines rotate in response to airflow. The plurality of turbines is in fluid communication with the pneumatic pump. The pneumatic pump is in fluid communication with the storage chamber. The storage chamber is in fluid communication with the pneumatic motor. The base is rotatably attached to the support structure. The plurality of turbines, after receiving airflow, passes the airflow to the pneumatic pump. The pneumatic pump passes the airflow to the storage chamber. The storage chamber stores and passes the airflow to the pneumatic pump. In response to the received airflow, the pneumatic pump powers the power generating component.

In some embodiments, the power generation system includes a base including a leading edge. The leading edge pushes airflow underneath the base to the plurality of towers. In some embodiments, each tower of the plurality of towers is independently controllable.

BRIEF DESCRIPTION OF THE SEVERAL VIEWS OF THE DRAWINGS

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
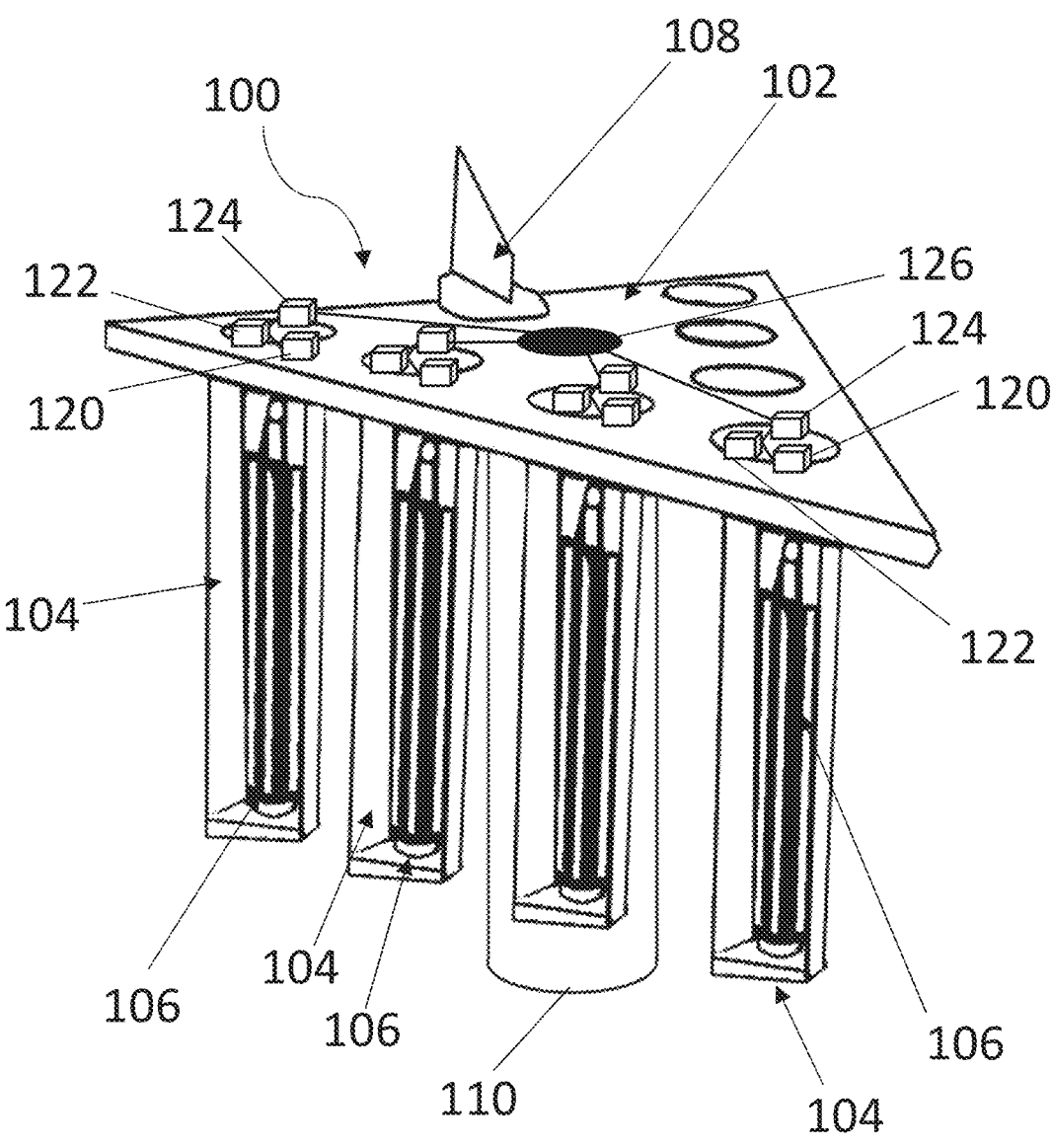
FIG. 1 illustrates a front perspective of a wind-based power generation system according to one embodiment of the present invention.

For the purposes of promoting an understanding of the present disclosure, reference will be made to preferred embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e., at least one) of the grammatical object of the article. By way of example, "a composite" means at least one composite and can include more than one composite.

Throughout the specification, the terms "about" and/or "approximately" may be used in conjunction with numerical values and/or ranges. The term "about" is understood to mean those values near to a recited value. For example, "about 40 [units]" may mean within +/−25% of 40 (e.g., from 30 to 50), within +/−20%, +/−15%, +/−10%, +/−9%, +/−8%, +/−7%, +/−6%, +/−5%, +/−4%, +/−3%, +/−2%, +/−1%, less than +/−1%, or any other value or range of values therein or there below. Furthermore, the phrases "less than about [a value]" or "greater than about [a value]" should be understood in view of the definition of the term "about" provided herein. The terms "about" and "approximately" may be used interchangeably.

As used herein, the verb "comprise" as is used in this description and in the claims and its conjugations are used in its non-limiting sense to mean that items following the word are included, but items not specifically mentioned are not excluded.

Throughout the specification the word "comprising," or variations such as "comprises" or "comprising," will be understood to imply the inclusion of a stated element, integer or step, or group of elements, integers, or steps, but not the exclusion of any other element, integer or step, or group of elements, integers or steps. The present disclosure may suitably "comprise", "consist of", or "consist essentially of", the steps, elements, and/or reagents described in the claims.

It is further noted that the claims may be drafted to exclude any optional element. As such, this statement is intended to serve as antecedent basis for use of such exclusive terminology as "solely", "only", and the like in connection with the recitation of claim elements, or the use of a "negative" limitation.

Unless defined otherwise, all technical and scientific terms used herein have the same meanings as commonly understood by one of ordinary skill in the art to which this disclosure belongs. Preferred methods, devices, and materials are described, although any methods and materials similar or equivalent to those described herein can be used in the practice or testing of the present disclosure. All references cited herein are incorporated by reference in their entirety.

The subject matter described herein includes a wind-based power generation system including a base, at least one tower, at least one turbine, at least one pneumatic motor, a wind tail component, an air storage chamber, and a power component. Advantageously, the present invention is operable to convert slow wind speeds (e.g., 8 miles per hour) received via the turbine into electricity via the pneumatic motor.

In some embodiments, a wind-based power generation system is disclosed. The wind-based power generation system includes a base, a plurality of towers including a plurality of turbines, a tail component, and a support structure. The plurality of towers is connected to the base. The tail component is positioned on top of the base. The plurality of turbines rotate in response to airflow. The base is rotatably attached to the support structure.

In some embodiments, the wind-based power generation system further includes a base including at least one pneumatic pump. The at least one pneumatic pump is in fluid communication with the plurality of turbines. In some embodiments, the base further includes a storage component in fluid communication with the at least one pneumatic pump. In some embodiments, the base further includes a pneumatic motor in fluid communication with the storage component. In some embodiments, the base further includes a power generator connected to the pneumatic motor and the power generator is driven by the pneumatic motor. In some embodiments, the tail component changes a direction and position of the base and the plurality of towers in response to a change of airflow (e.g., wind) direction. In some embodiments, the base comprises concrete. In some embodiments, the plurality of towers includes a triangular shape, a rectangular shape, or a hexagonal shape. In some embodiments, the base further includes a leading edge designed to push airflow underneath the base to the plurality of towers. In some embodiments, each tower of the plurality of towers is independently controllable. In some embodiments, each tower of the plurality of towers includes carbon fiber and a honeycomb shape. In some embodiments, each tower of the plurality of towers is magnetically attached to the base.

In some embodiments, a wind-based power generation system is closed. The wind-based power generation system includes a base including a pneumatic pump, a storage chamber, and a pneumatic motor, a plurality of towers including a plurality of turbines, a tail component, and a support structure. The plurality of towers is connected to the base. The plurality of turbines rotate in response to airflow. The plurality of turbines is in fluid communication with the pneumatic pump. The pneumatic pump is in fluid communication with the storage chamber. The storage chamber is in fluid communication with the pneumatic motor. The base is rotatably attached to the support structure.

In some embodiments, the wind-based power generation system further includes a power generator driven by the pneumatic motor. In some embodiments, the tail component is designed to change a direction and/or position of the base and the plurality of towers in response to a change of airflow (e.g., wind) direction. In some embodiments, the wind-based power generation system includes a plurality of towers including a triangular shape, a rectangular shape, or a hexagonal shape. In some embodiments, the base further includes a leading edge designed to push airflow underneath the base to the plurality of towers.

In some embodiments, a wind-based power generation system is disclosed. The wind-based power generation system includes a base including a pneumatic pump, a storage chamber, a pneumatic motor, and a power generating component. The wind-based power generation system further includes a plurality of towers including a plurality of turbines, a tail component, and a support structure. The plurality of towers is connected to the base. The plurality of turbines rotate in response to airflow. The plurality of turbines is in fluid communication with the pneumatic pump. The pneumatic pump is in fluid communication with the storage chamber. The storage chamber is in fluid communication with the pneumatic motor. The base is rotatably attached to the support structure. The plurality of turbines, after receiving airflow, passes the airflow to the pneumatic pump. The pneumatic pump passes the airflow to the storage chamber. The storage chamber stores and passes the airflow to the pneumatic pump. In response to the received airflow, the pneumatic pump powers the power generating component.

In some embodiments, the power generation system includes a base including a leading edge. The leading edge pushes airflow underneath the base to the plurality of towers. In some embodiments, each tower of the plurality of towers is independently controllable.

In one embodiment, as shown in FIG. 1, the present invention includes a wind-based power generation system 100 including a base 102, a plurality of towers 104 including a plurality of turbines 106, and a tail component 108. The base 102 is designed to hold the plurality of towers 104. Each tower of the plurality of towers includes a turbine 106. Each tower includes an open face towards the front of the wind-based power generation system 100 that enables the plurality of turbines 106 to receive wind. Each turbine 106 is designed to rotate in response to the wind and transmit the rotational energy to a pneumatic pump 120 positioned within the base 102. In one embodiment, the pneumatic pump 120 is mounted at the top of each turbine. The pneumatic pump 120 is designed to build up air pressure into an air storage body 122 and/or chamber positioned within the base 102. Once enough air pressure is built up, the air is controllably released from the pneumatic pump 120 to a pneumatic motor 124. The pneumatic motor 124 drives a power generator 126. Advantageously, the tail component 108 is designed to position the wind-based power generation system 100 to face the wind, even when the direction of the wind changes. The wind-based power generation system further includes at least one support structure 110 attached to the base 102. The base 102 is rotatably attached to the at least one support structure 110, thereby enabling the wind-based power generation system to move in response to changes in wind direction.

In one embodiment, the base 102 comprises concrete. The base is further designed to receive a plurality of tubes. For example, and limitation, in one embodiment, the plurality of tubes is cylindrical. Alternatively, the plurality of tubes is triangular, rectangular, hexagonal, and/or other similar polygonal shapes. In one embodiment, each tube is bolted to the base of the wind-based power generation system. Yet another embodiment of the present invention includes a wind-based power generation system with a base including a leading edge. The leading edge includes a downward curve that results in airflow being directed underneath the base and towards the towers and turbines. Advantageously, this creates downward pressure instead of the upward lift that usually occurs with windmills and increases the airflow to the wind-based power generation system. For example, and not limitation, the leading edge includes a flat top surface and a curved bottom surface.

Figure 2:
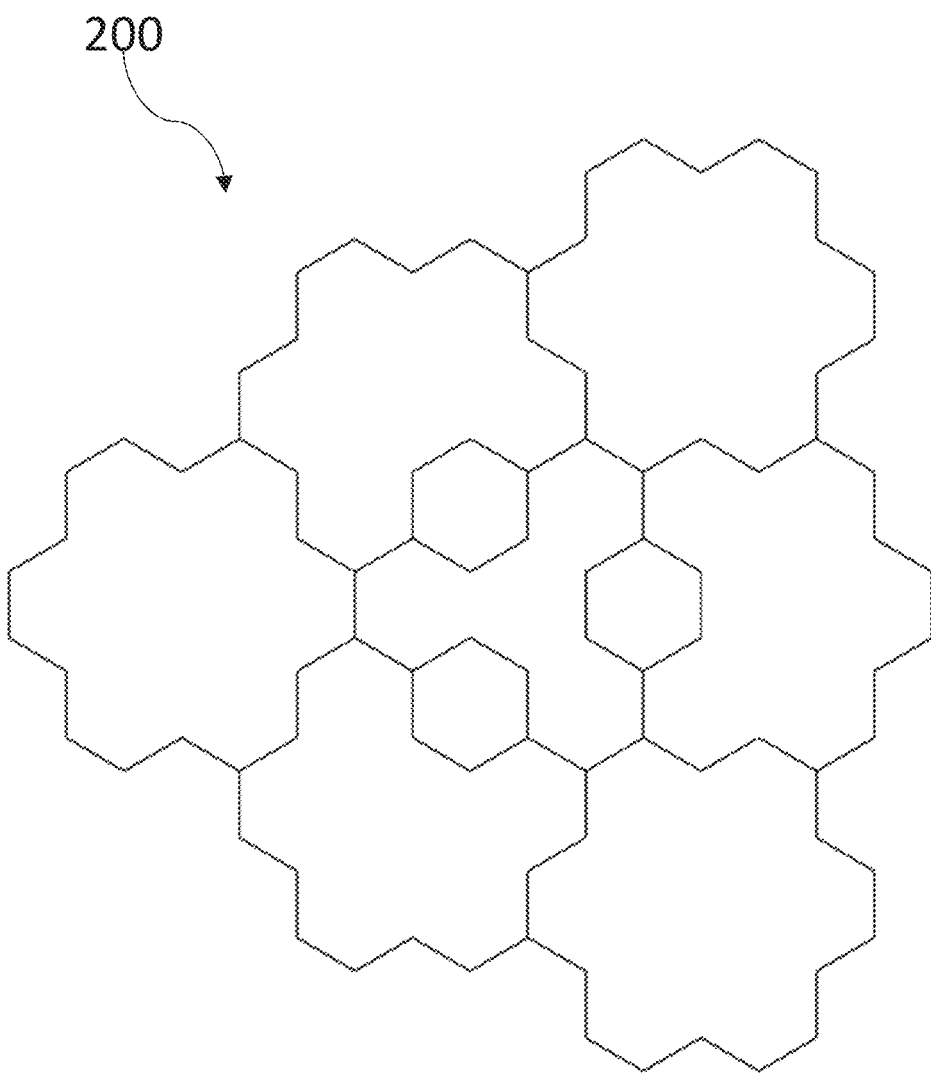
FIG. 2 illustrates a top view of a tower of a wind-based power generation system according to one embodiment of the present invention.

FIG. 2 illustrates a top view of a plurality of towers 200 of a wind-based power generation system according to one embodiment of the present invention. For example, and not limitation, the wind-based power generation system includes a plurality of towers 200 that is hexagon shaped.

Figure 3:
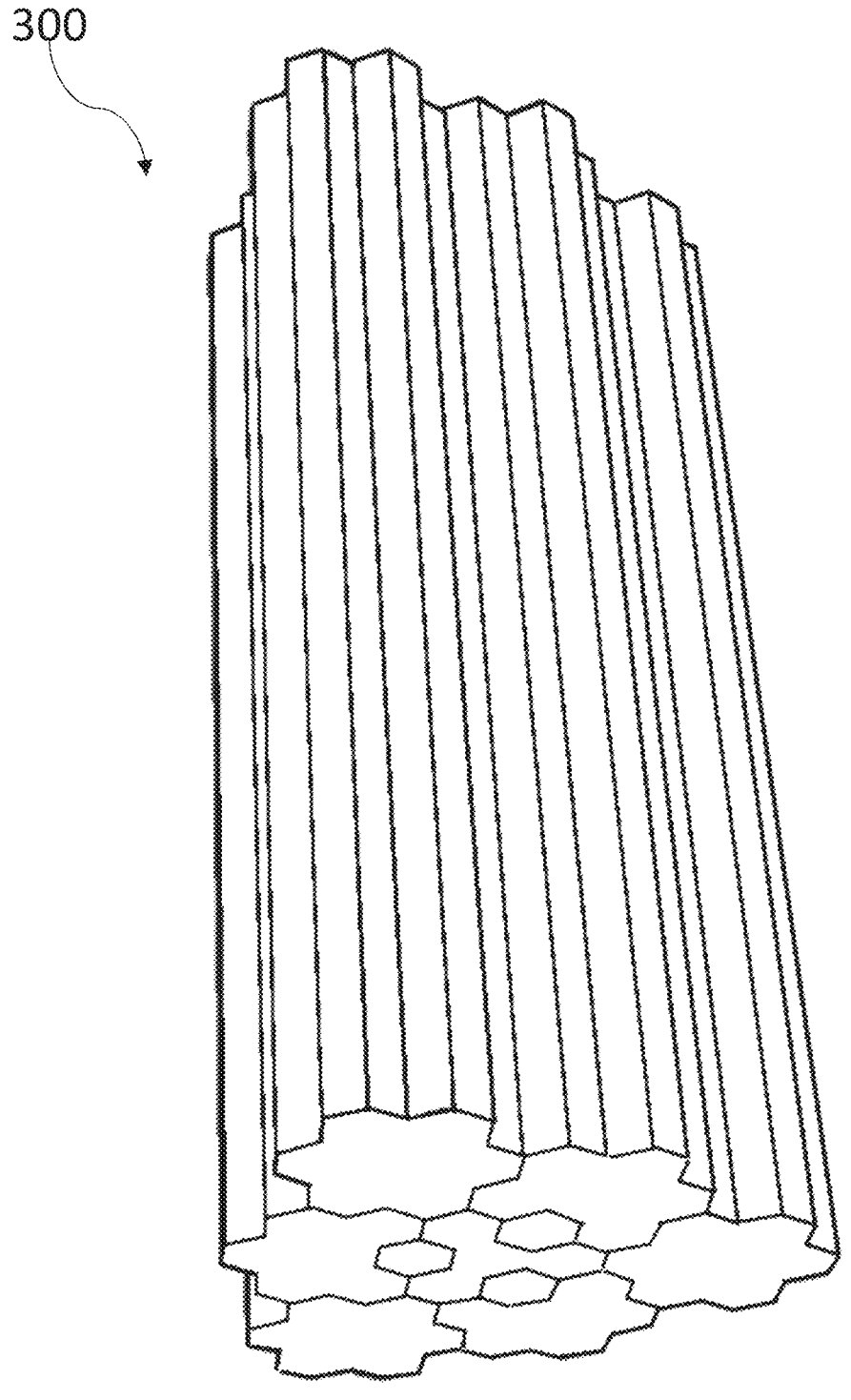
FIG. 3 illustrates a bottom perspective view of a tower of a wind-based power generation system according to one embodiment of the present invention.
Figure 4:
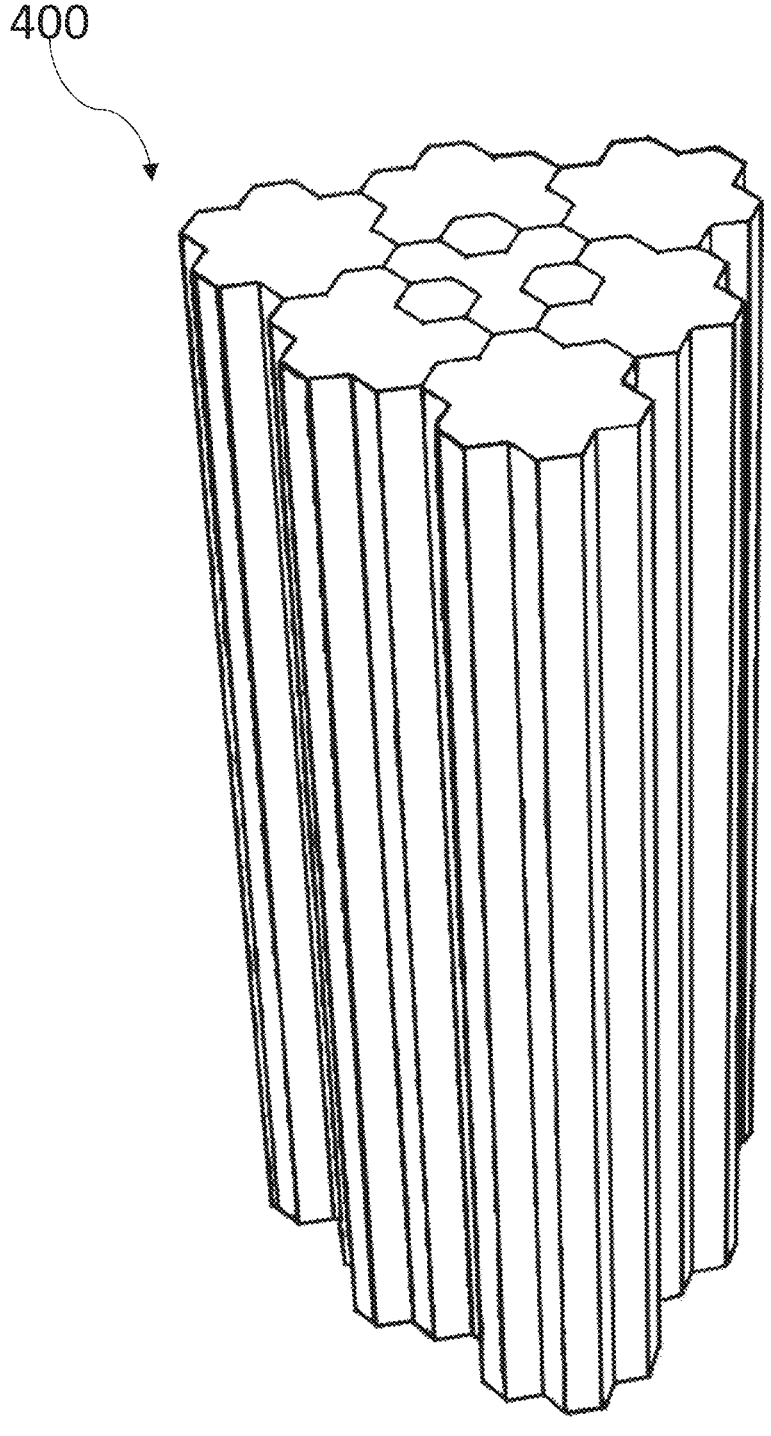
FIG. 4 illustrates a front perspective view of a tower of a wind-based power generation system according to one embodiment of the present invention.
Figure 5:
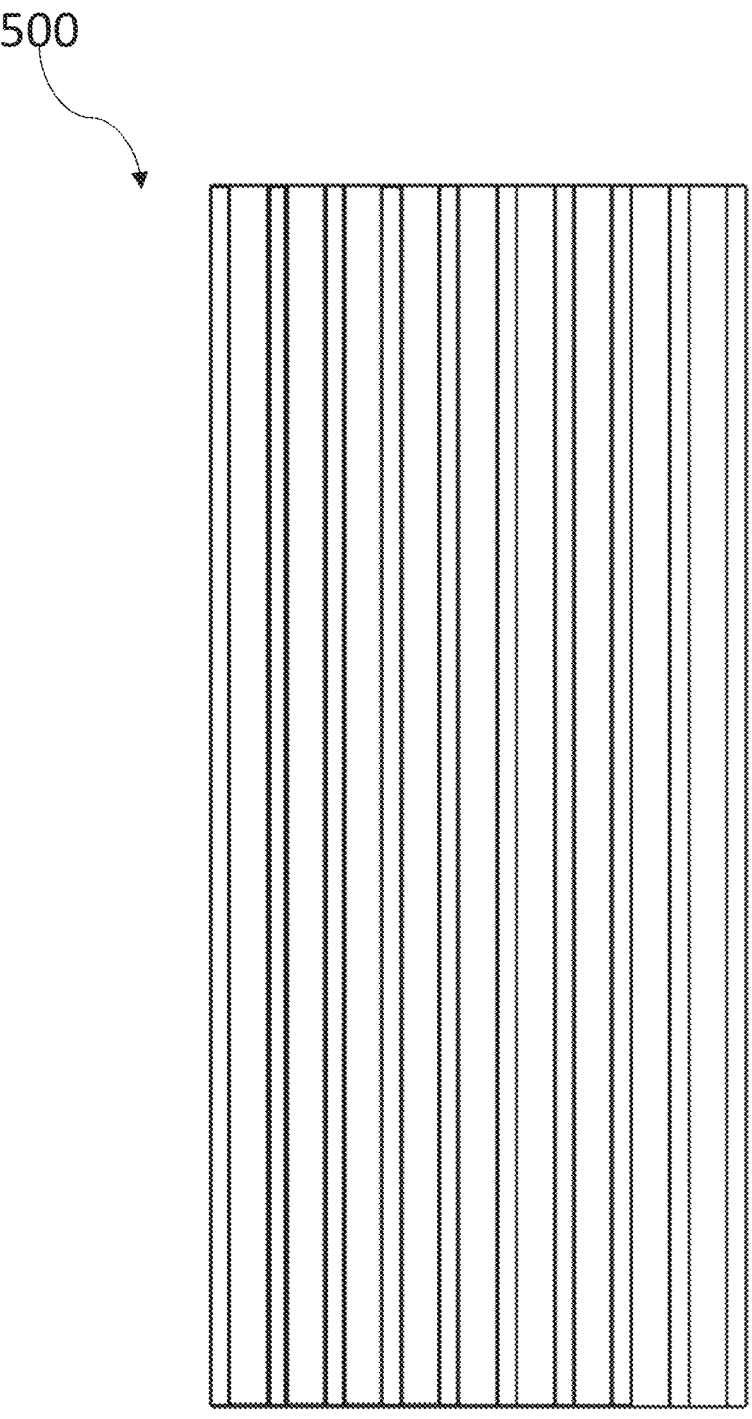
FIG. 5 illustrates a side view of a tower of a wind-based power generation system according to one embodiment of the present invention.

FIG. 3 illustrates a tower 300 according to one embodiment of the present invention. FIG. 4 illustrates a top-front perspective view of a tower 400 according to one embodiment of the present invention. FIG. 5 illustrates a side view of a tower 500 according to one embodiment of the present invention. In yet another embodiment, each hexagonal component of the tower includes at least one internal tube with electrical wiring. For example, and not limitation, the tube comprises fiberglass. In another embodiment, the tower is designed to receive a plurality of hexagonal components. Each hexagonal component of the plurality of hexagonal components is operable to attach to a second hexagonal component of the plurality of hexagonal components. For example, and not limitation, each hexagonal component is wrapped and bonded to a second hexagonal component using fiberglass.

In yet another embodiment, the wind-based power generation system further includes a generator housing positioned on top of each tower. The generator housing includes at least one generator. In one example, the generator is mounted vertically in the center of the generator housing. The base of the generator includes a thrust bearing that gives the generator a spinning surface to ride on, thereby reducing friction. The generator further includes greaseless sealed bearings. Advantageously, this decreases the amount of maintenance required for the wind-based power generation system because the bearings will not need to be greased.

In another example, the generator housing includes an air motor mounted on top of the base. The air motor is designed to drive the generator by supplying constant air pressure. Typical windmills rely on slow moving motors and/or generators with large gears that require grease to continue to function. These motors and/or generators are limited by speed due to the size and maintenance of the gears. Advantageously, the present invention does not need greased bearings because the pneumatic functionality of the present invention enables a constant airflow at a low speed and decreases the need for maintenance.

Figure 6:
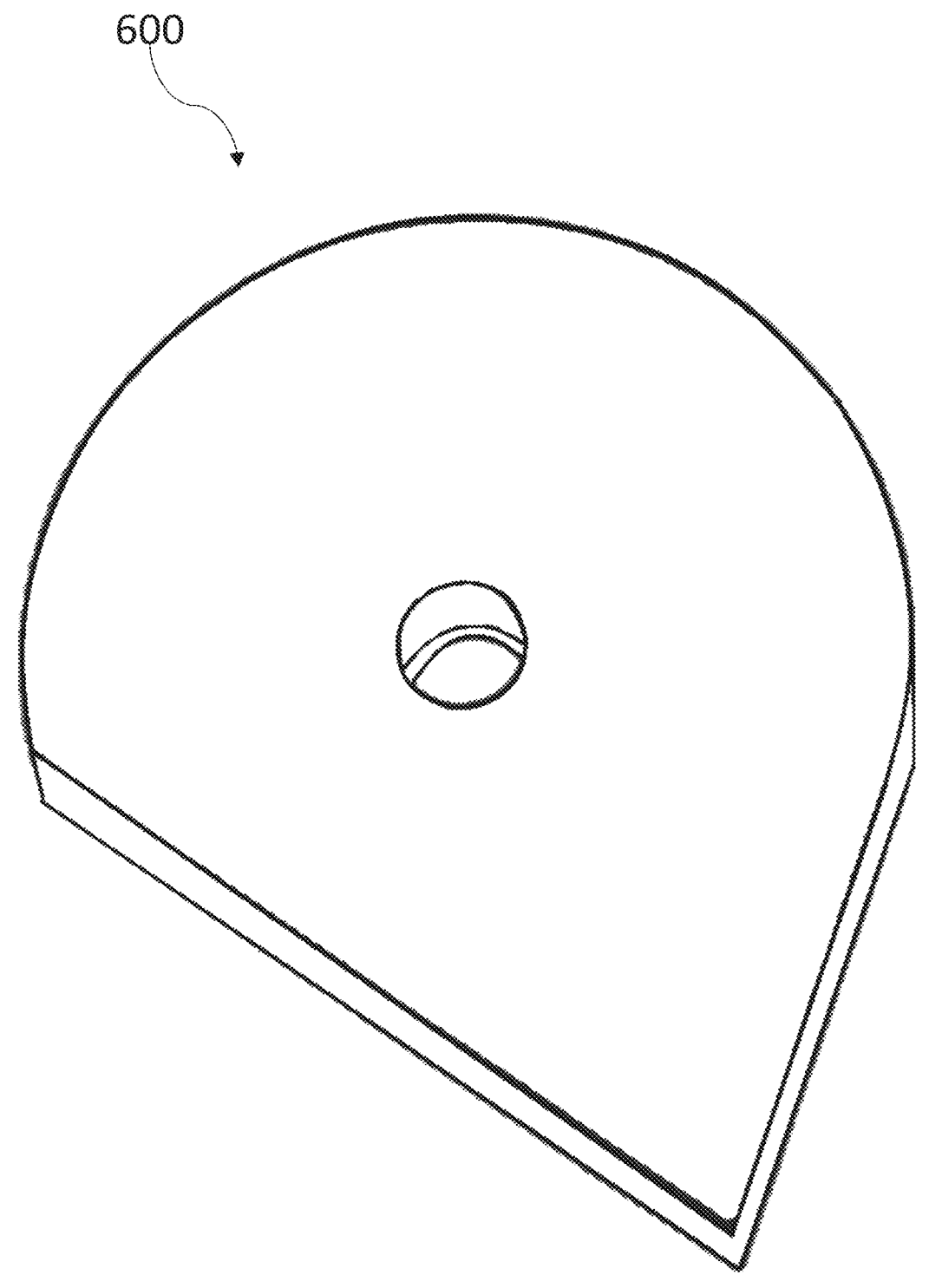
FIG. 6 illustrates a top perspective view of a turbine holder of a wind-based power generation system according to one embodiment of the present invention.
Figure 7:
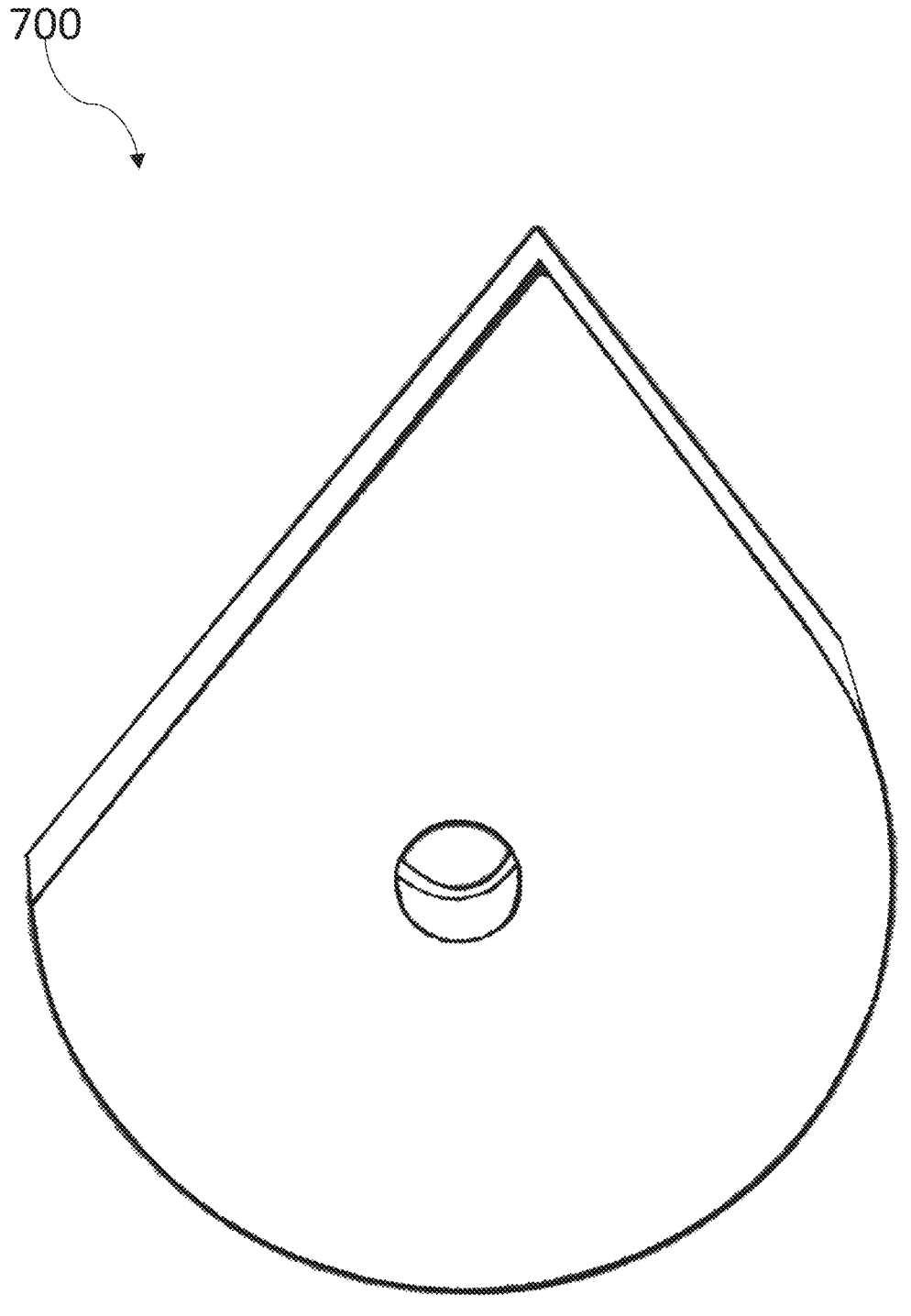
FIG. 7 illustrates a bottom perspective view of a turbine holder of a wind-based power generation system according to one embodiment of the present invention.

FIGS. 6-7 illustrate turbine holders according to one embodiment of the present invention. Each turbine holder (600 and 700) includes at least one hole designed to receive a corresponding attachment component of the turbine. For example, and not limitation, the turbine includes an extended circular portion that is designed to insert into the hole of the turbine holder.

Figure 8:
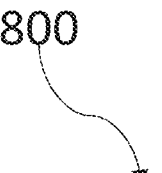
FIG. 8 illustrates a front perspective view of a turbine body of a wind-based power generation system according to one embodiment of the present invention.
Figure 8:
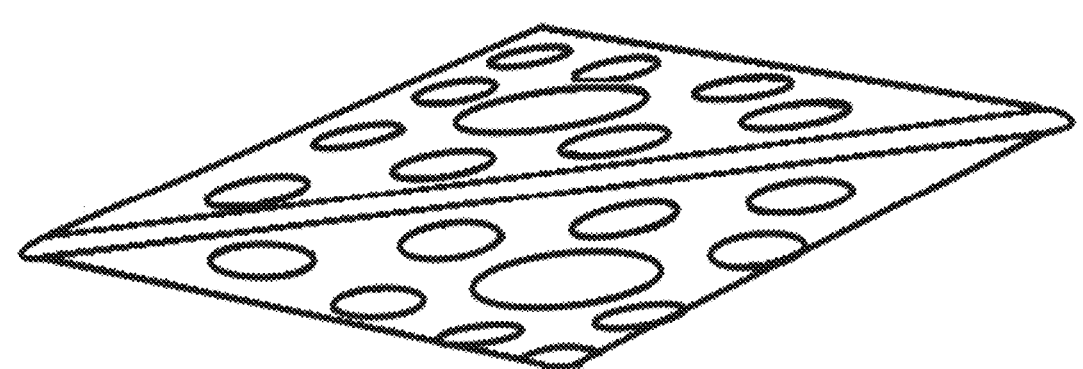
Figure 9:
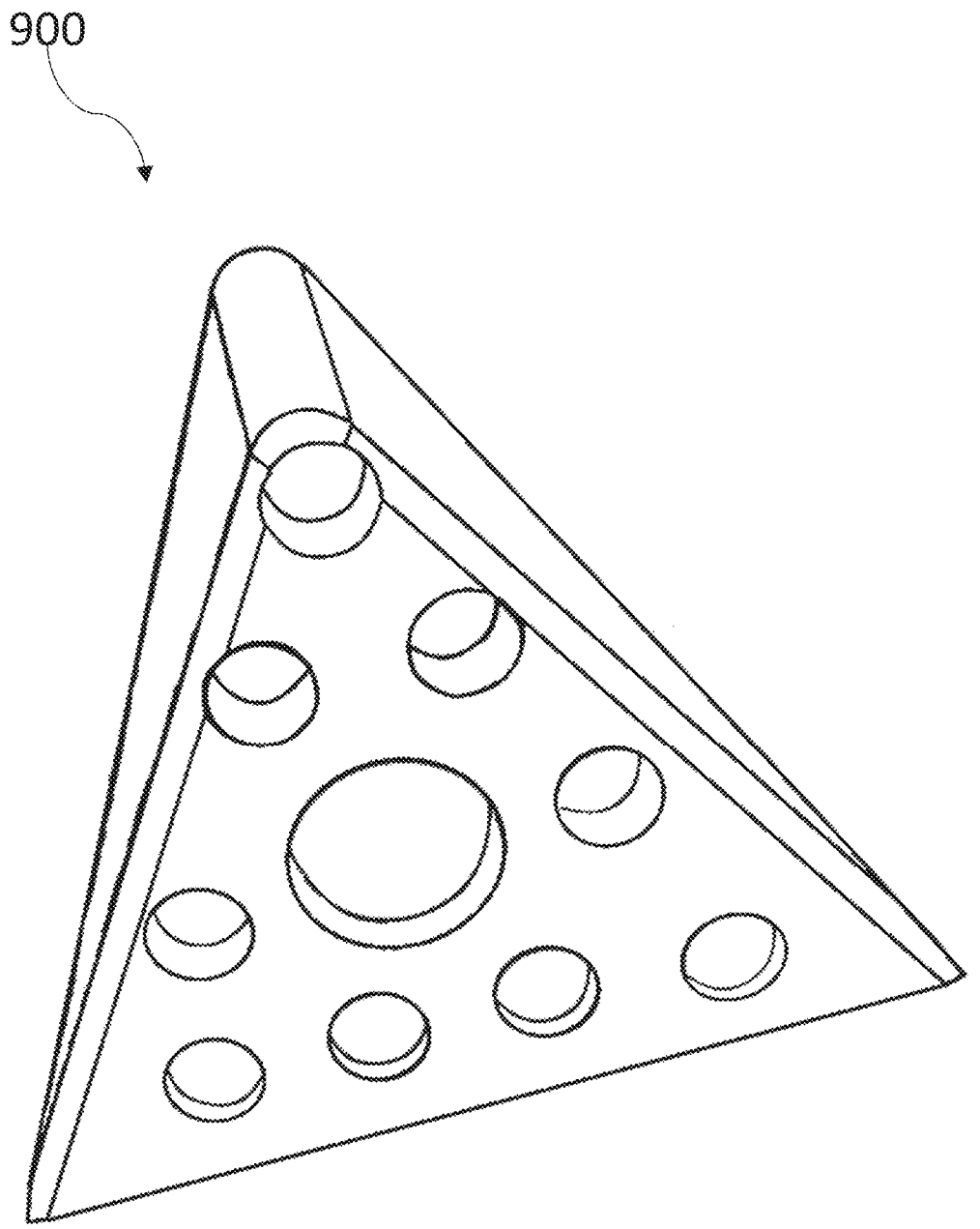
FIG. 9 illustrates a bottom perspective view of a turbine body of a wind-based power generation system according to one embodiment of the present invention.
Figure 10:
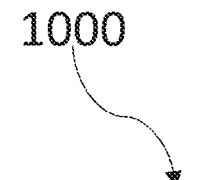
FIG. 10 illustrates a top perspective view of a turbine body of a wind-based power generation system according to one embodiment of the present invention.
Figure 10:
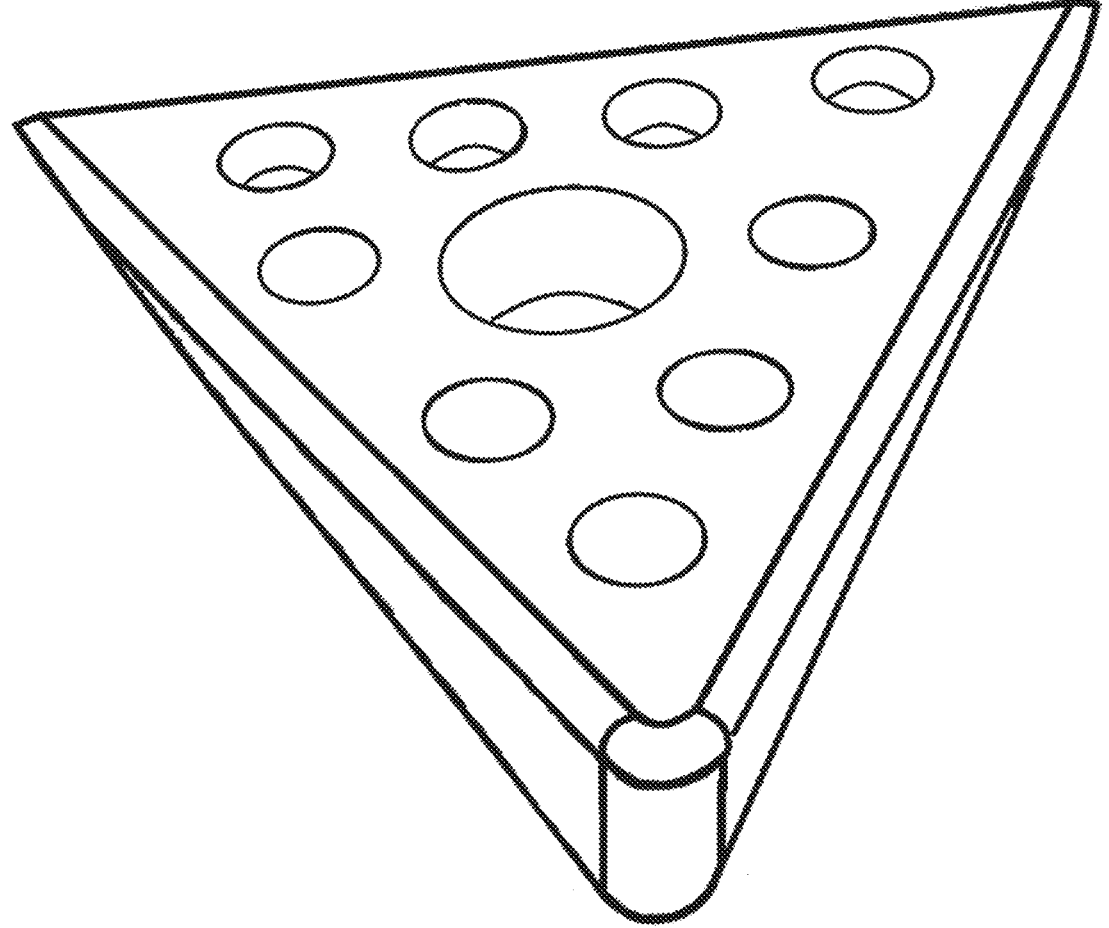
Figure 11:
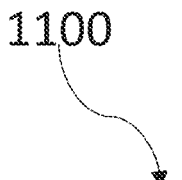
FIG. 11 illustrates a front top perspective view of a turbine body of a wind-based power generation system according to one embodiment of the present invention.
Figure 11:
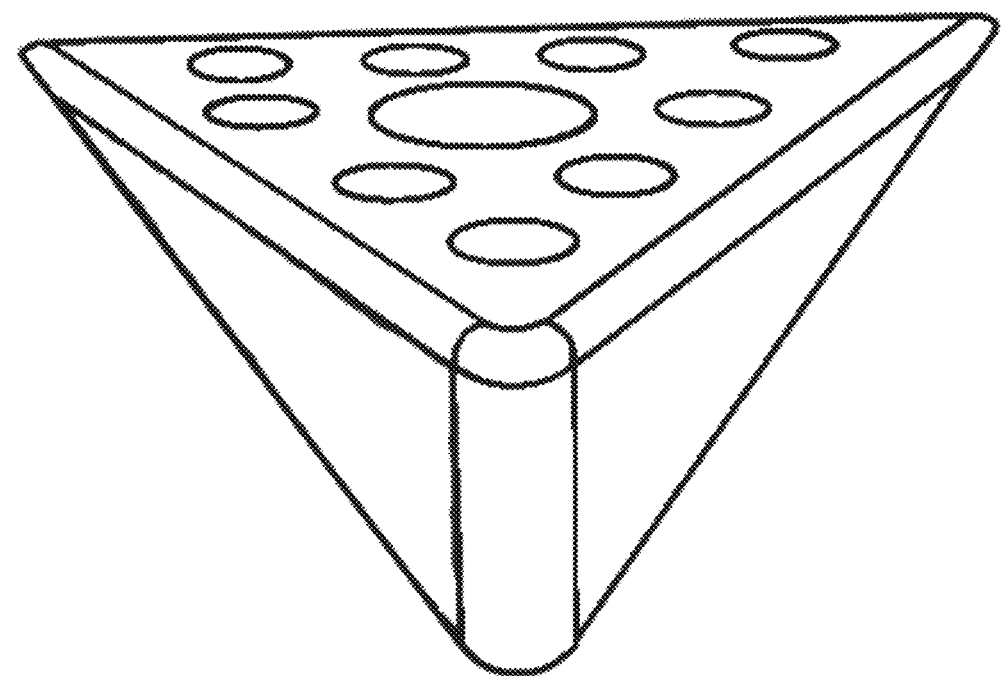
Figure 12:
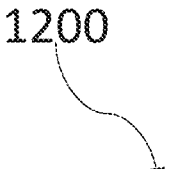
FIG. 12 illustrates a side perspective view of a turbine body of a wind-based power generation system according to one embodiment of the present invention.
Figure 12:
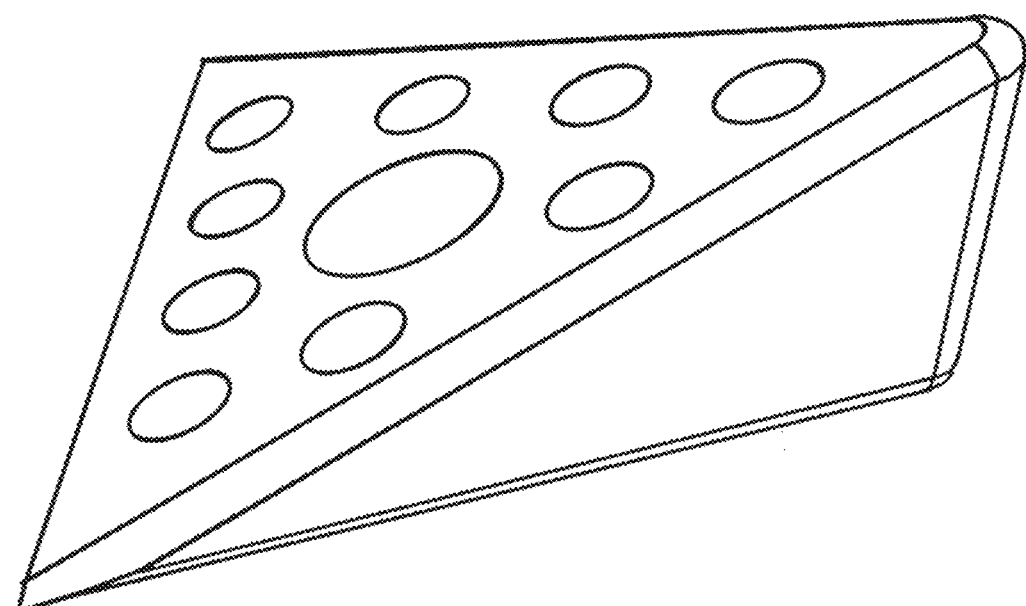

FIGS. 8-12 illustrate a turbine body according to one embodiment of the present invention. FIG. 8 illustrates a front perspective view of a turbine body 800 of a wind-based power generation system according to one embodiment of the present invention. FIG. 9 illustrates a bottom perspective view of a turbine body 900 of a wind-based power generation system according to one embodiment of the present invention. FIG. 10 illustrates a top- perspective view of a turbine body 1000 of a wind-based power generation system according to one embodiment of the present invention. FIG. 11 illustrates a front-top perspective view of a turbine body 1100 of a wind-based power generation system according to one embodiment of the present invention. FIG. 12 illustrates a side perspective view of a turbine body 1200 of a wind-based power generation system according to one embodiment of the present invention. The turbine body is operable to receive at least one turbine via a mount and/or other similar attachment mechanism.

Figure 13:
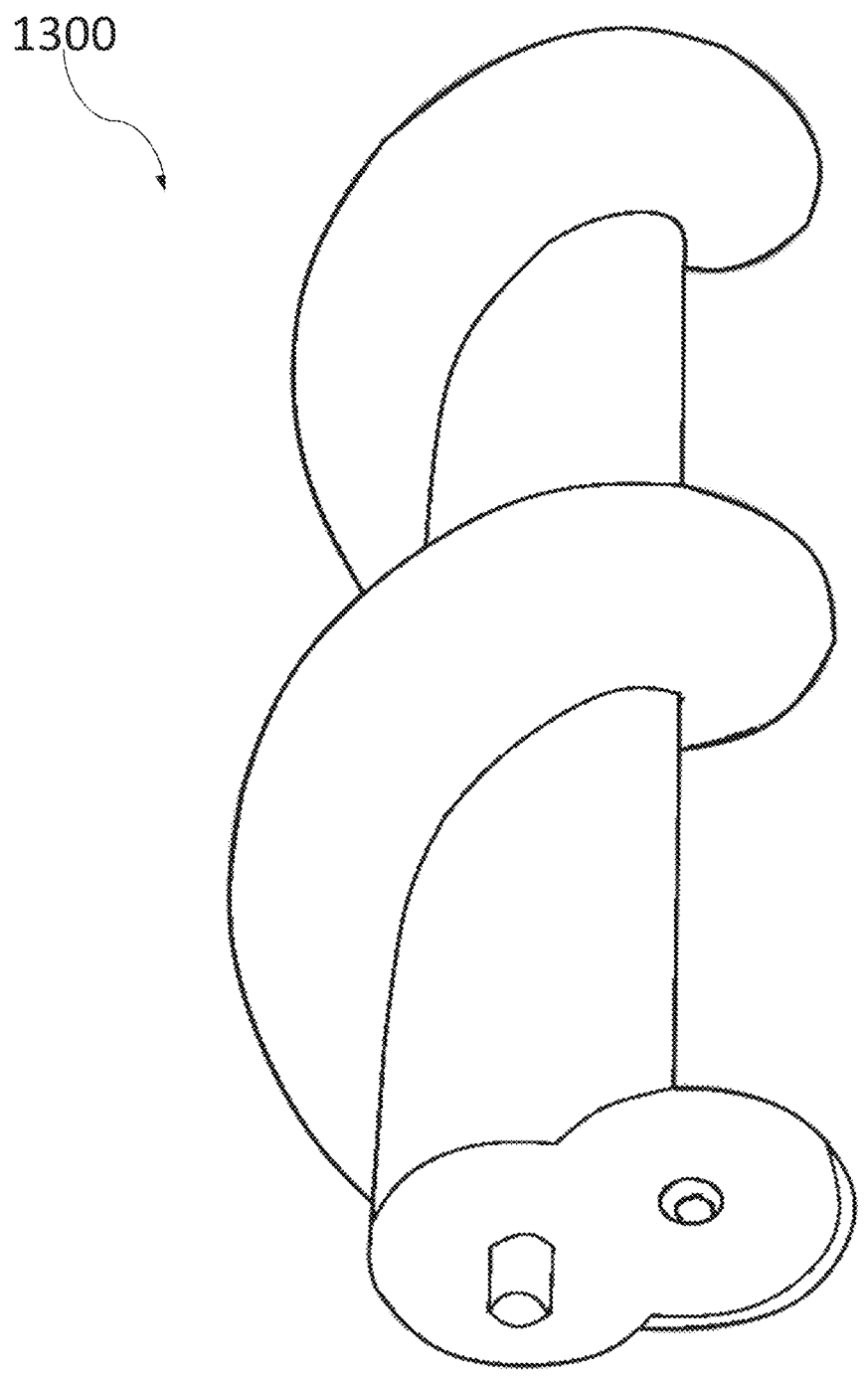
FIG. 13 illustrates a bottom perspective view of a turbine of a wind-based power generation system according to one embodiment of the present invention.
Figure 14:
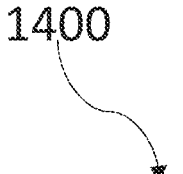
FIG. 14 illustrates a front perspective view of a turbine of a wind-based power generation system according to one embodiment of the present invention.
Figure 14:
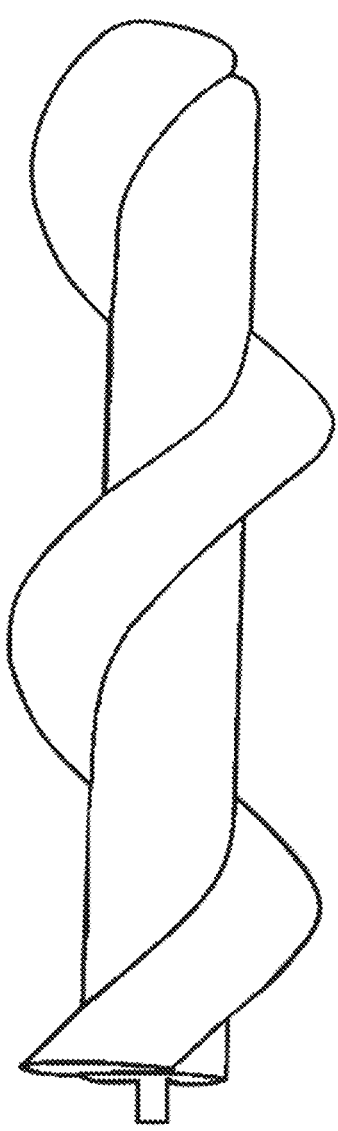
Figure 15:
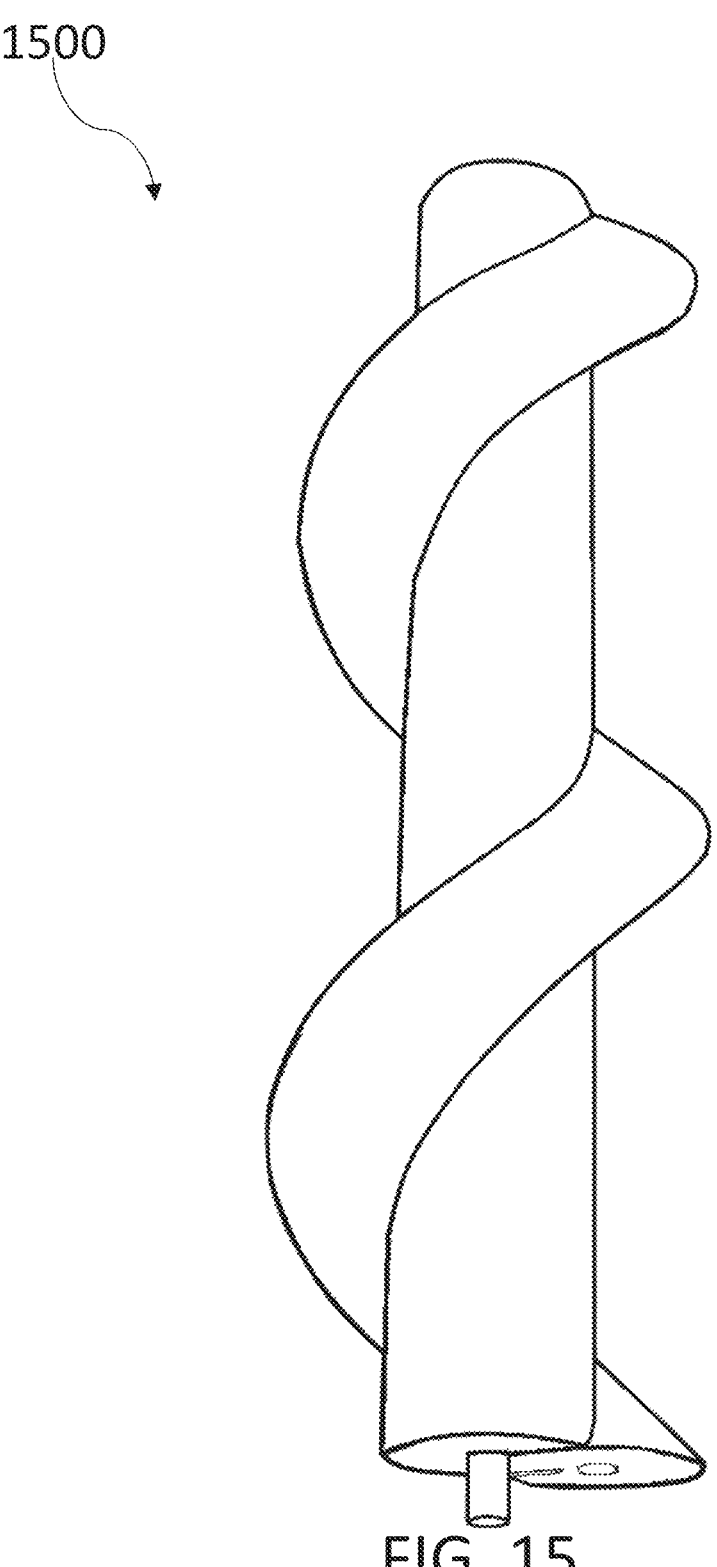
FIG. 15 illustrates a rear perspective view of a turbine of a wind-based power generation system according to one embodiment of the present invention.

FIG. 13 illustrates a bottom perspective view of a turbine 1300 of a wind-based power generation system according to one embodiment of the present invention. FIG. 14 illustrates a front perspective view of a turbine 1400 of a wind-based power generation system according to one embodiment of the present invention. FIG. 15 illustrates a rear perspective view of a turbine 1500 of a wind-based power generation system according to one embodiment of the present invention. For example, and not limitation, the turbine is helical shaped.

In yet another embodiment, the present invention includes a wind-based power generation system designed for individually controllable towers. Instead of turning alternators, the plurality of towers is designed to turn pneumatic pumps, which turn a pneumatic motor that turns a pneumatic generator. Advantageously, the tail component of the wind-based power generation system is designed to keep the nose of the base centered into the wind. The tail component further controls the speed of the wind through the turbine of each tower by adjusting the face of the wind-based power generation system. Advantageously, the pneumatic pumps, pneumatic motors, and pneumatic generators do not need high winds or high pressure to create electricity (e.g., about 4 to about 5 miles per hour (MPH)). Furthermore, solely relying on air enables the present invention to use sealed bearings without grease.

For example, and not limitation, in one embodiment, the wind-based power generation system comprises carbon fiber and includes a honeycomb structure. Each tower is selectively controllable and replaceable. Advantageously, when a tower fails to function properly, it can be swapped out without stopping the entire wind-based power generation system. For example, and not limitation, each tower is operable to be removed via magnet. The magnet is designed to attach to a corresponding magnet of another device and/or vehicle. The vehicle includes a helicopter, an airplane, and other similar vehicles. Once the tower magnet and the corresponding magnet are connected, the individual tower is designed to twist and slide out of the wind-based power generation system. A second tower is operable to be inserted into and twisted into the wind-based power generation system.

In one embodiment, the generator housing includes control electronics. The control electronics include a voltage-sensing circuit, an analog-to-digital converter (ADC), a processor, the indicator, and optionally a driver. The voltage sensing circuit can be any standard voltage sensing circuit, such as those found in volt meters. An input voltage VIN is supplied via the power BUS. In one embodiment, the voltage sensing circuit includes standard amplification or de-amplification functions for generating an analog voltage that correlates to the amplitude of the input voltage VIN that is present. The ADC receives the analog voltage from the voltage sensing circuit and performs a standard analog-to-digital conversion.

The processor manages the overall operations of the wind-based power generation system. The processor is any controller, microcontroller, or microprocessor that is capable of processing program instructions. In one embodiment, the control electronics includes at least one antenna, which enables the wind-based power generation system to send information (e.g., wind speed, tower and/or turbine condition) to at least one remote device (e.g., smartphone, tablet, laptop computer) and/or receive information (e.g., timing commands, power commands) from at least one remote device. The at least one antenna provides wireless communication, standards-based or non-standards-based, by way of example and not limitation, radiofrequency (RF), BLUETOOTH, ZIGBEE, NEAR FIELD COMMUNICATION (NFC), or other similar communication methods.

Figure 16:
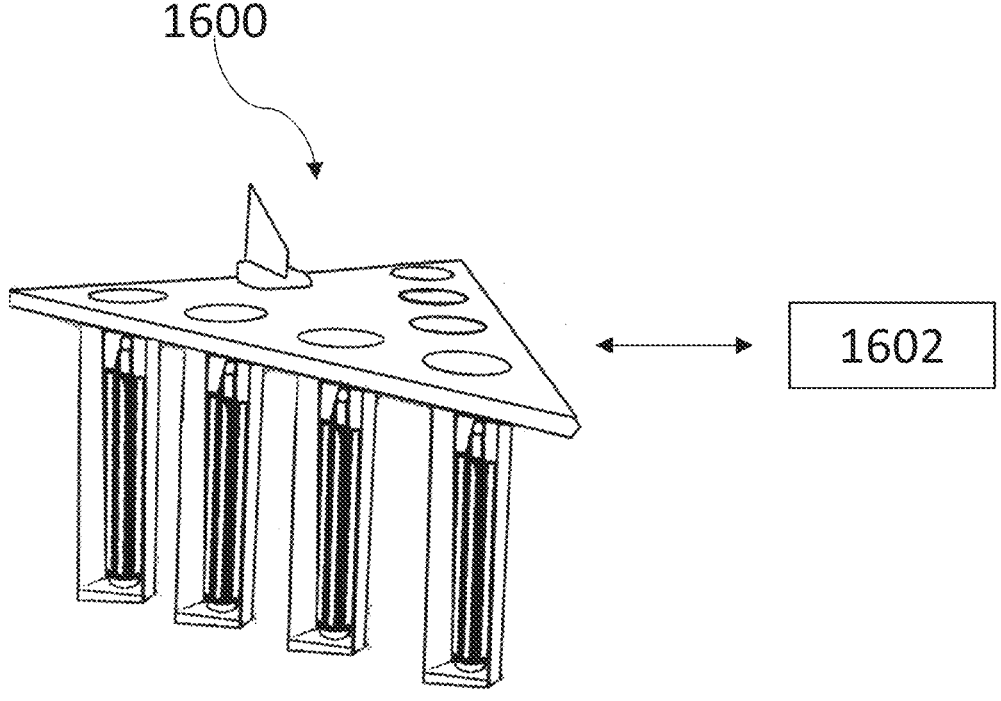
FIG. 16 illustrates a schematic diagram of a wind-based power generation system according to one embodiment of the present invention.

For example, and not limitation, as shown in FIG. 16, in one embodiment, the wind-based power generation system 1600 is network communication with at least one remote device 1602. Advantageously, the wind-based power generation system is operable to send real-time updates to the at least one remote device and receive commands in real-time from the at least one remote device. The wind-based power generation system is operable to generate an alert when a turbine is broken. The at least one remote-device is operable to transmit a power request to the wind-based power generation system. The power request includes a demand for electrical power generated by the wind-based power generation system. For example, and not limitation, the wind-based power generation system is electrically connected to a power grid and is designed to transmit power generated to the power grid.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A wind-based power generation system comprising:
   a base;
   a plurality of towers including a plurality of turbines;
   a tail component; and
   a support structure;
      wherein the plurality of towers is connected to the base;
      wherein the tail component is positioned on a top of the base;
      wherein the plurality of turbines rotate in response to airflow;
      wherein the base is rotatably attached to the support structure; and
      wherein the base further includes at least one pneumatic pump, wherein the at least one pneumatic pump is in fluid communication with the plurality of turbines.

2. The wind-based power generation system of claim 1, wherein the base further includes a storage component, wherein the storage component is in fluid communication with the at least one pneumatic pump.

3. The wind-based power generation system of claim 2, wherein the base further includes a pneumatic motor, wherein the pneumatic motor is in fluid communication with the storage component.

4. The wind-based power generation system of claim 3, wherein the base further includes a power generator connected to the pneumatic motor, wherein the pneumatic motor drives the power generator.

5. The wind-based power generation system of claim 1, wherein the tail component is designed to change a direction of the base and the plurality of towers in response to a change of airflow direction.

6. The wind-based power generation system of claim 1, wherein the base comprises concrete.

7. The wind-based power generation system of claim 1, wherein the plurality of towers includes a triangular shape, a rectangular shape, or a hexagonal shape.

8. The wind-based power generation system of claim 1, wherein the base further comprises a leading edge, wherein the leading edge pushes airflow underneath the base to the plurality of towers.

9. The wind-based power generation system of claim 1, wherein each tower of the plurality of towers is independently controllable.

10. The wind-based power generation system of claim 1, wherein each tower of the plurality of towers includes carbon fiber and a honeycomb shape.

11. The wind-based power generation system of claim 1, wherein each tower of the plurality of towers is magnetically attached to the base.

12. A wind-based power generation system comprising:
   a base including a pneumatic pump, a storage chamber, and a pneumatic motor;
   a plurality of towers including a plurality of turbines;

a tail component; and a support structure;

wherein the plurality of towers is connected to the base;

wherein the plurality of turbines rotate in response to airflow;

wherein the plurality of turbines is in fluid communication with the pneumatic pump;

wherein the pneumatic pump is in fluid communication with the storage chamber;

wherein the storage chamber is in fluid communication with the pneumatic motor; and wherein the base is rotatably attached to the support structure.

13. The wind-based power generation system of claim 12, wherein the base further comprises a power generator, wherein the power generator is driven by the pneumatic motor.

14. The wind-based power generation system of claim 12, wherein the tail component is designed to change a direction of the base and the plurality of towers in response to a change in airflow direction.

15. The wind-based power generation system of claim 12, wherein the plurality of towers includes a triangular shape, a rectangular shape, or a hexagonal shape.

16. The wind-based power generation system of claim 12, wherein the base further comprises a leading edge, wherein the leading edge pushes airflow underneath the base to the plurality of towers.

17. A wind-based power generation system comprising:

a base including a pneumatic pump, a storage chamber, a pneumatic motor, and a power generating component;

a plurality of towers including a plurality of turbines;

a tail component; and a support structure;

wherein the plurality of towers is connected to the base;

wherein the plurality of turbines rotate in response to airflow;

wherein the plurality of turbines is in fluid communication with the pneumatic pump;

wherein the pneumatic pump is in fluid communication with the storage chamber;

wherein the storage chamber is in fluid communication with the pneumatic motor;

wherein the base is rotatably attached to the support structure; and wherein, after receiving airflow, the plurality of turbines passes the airflow to the pneumatic pump, wherein the pneumatic pump passes the airflow to the storage chamber, wherein the storage chamber stores and passes the airflow to the pneumatic motor, wherein the pneumatic motor powers the power generating component.

18. The wind-based power generation system of claim 17, wherein the base further comprises a leading edge, wherein the leading edge pushes airflow underneath the base to the plurality of towers.

19. The wind-based power generation system of claim 17, wherein each tower of the plurality of towers is independently controllable.

\* \* \* \* \*